(12) United States Patent
Shimotani et al.

(10) Patent No.: US 6,460,329 B2
(45) Date of Patent: Oct. 8, 2002

(54) EXHAUST GAS PURIFYING FACILITY WITH NITROGEN OXIDES ABSORPTION-REDUCTION CATALYST

(75) Inventors: Keiji Shimotani; Hiroshi Tsunoda; Hiroyuki Yamada, all of Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/875,918

(22) Filed: Jun. 8, 2001

(65) Prior Publication Data

US 2002/0026790 A1 Mar. 7, 2002

(30) Foreign Application Priority Data

Jun. 16, 2000 (JP) ........................................ 2000-180832

(51) Int. Cl.$^7$ ................................................. F01N 3/00
(52) U.S. Cl. .............................. 60/285; 60/286; 60/297
(58) Field of Search .......................... 60/285, 286, 295, 60/297, 276, 301

(56) References Cited

U.S. PATENT DOCUMENTS 5,970,707 A * 10/1999 Sawada et al. ............... 60/277
5,974,794 A * 11/1999 Gotoh et al. .................. 60/286
6,195,987 B1 * 3/2001 Miyashita ..................... 60/285
6,237,330 B1 * 5/2001 Takahashi et al. ............ 60/285
6,263,667 B1 * 7/2001 Sawada et al. ............... 60/277

* cited by examiner

Primary Examiner—Thomas Denion
Assistant Examiner—Binh Tran
(74) Attorney, Agent, or Firm—Staas & Halsey LLP

(57) ABSTRACT

In an exhaust gas purifying apparatus 1 provided with a nitrogen oxides absorption-reduction catalyst 2 for executing rich spike when the integrated value NOx mass of the NOx computed from the operating state of the engine E exceeds the predetermined first reference value NOxSL, a NOx sensor 13 is provided downstream from the nitrogen oxides absorption-reduction catalyst 2 so that the predetermined first reference value NOXSL is corrected when the value RSNOX detected by the NOx sensor 13 immediately after the rich spike is executed exceeds the predetermined second reference value RSSL. In this arrangement, since the variations in the NOx absorbing amount caused by the deterioration of the catalyst is monitored using the value detected by the NOx sensor for introducing a rich spike at appropriate moments, the purifying performance with respect to NOx in exhaust gas can be improved outstanding as a hole.

3 Claims, 5 Drawing Sheets

(A)

(B)

EXHAUST GAS PURIFYING FACILITY WITH NITROGEN OXIDES ABSORPTION-REDUCTION CATALYST

BACKGROUND OF THE INVENTION

The present invention relates to an exhaust gas purifying facility with a nitrogen oxides absorption-reduction catalyst (hereinafter referred to as NOx absorption-reduction catalyst) for purifying nitrogen oxides (NOx) in exhaust gas by absorbing NOx when the air/fuel ratio of exhaust gas of the internal combustion engine is lean, and by discharging and reducing NOx when it is rich.

More specifically, the present invention relates to an exhaust gas purifying facility that may be applied to all the lean burn vehicles and is provided with an NOx absorption-reduction catalyst and an NOx sensor so that NOx absorption-reduction catalyst can be regenerated every appropriate period of time while using the detected value of the NOx sensor for the operation of an engine employing a lean-burn system.

As one of effective technologies for improving fuel consumption of gasoline engines, there is a lean-burn system. However, this system has a problem in that three-way catalyst that is used conventionally cannot be used for purification of NOx since a plenty of oxygen is contained in exhaust gas. Accordingly, a development of catalysts that can purify NOx even when exhaust gas is in the hyperoxia atmosphere has been made.

As a consequent, an NOx absorption-reduction catalyst in which NOx is absorbed in basic element such as barium (Ba) or the like in the region of lean air/fuel ratio and then the absorbed NOx is desorped (discharged) and reduced in the region of rich air/fuel ratio has developed recently and already commercialized.

As an example of the conventional NOx absorption-reduction catalysts, there is an NOx absorption-reduction catalyst having a NOx absorbing substance, as stated in Japanese Patent Publication No. 2600492. The arrangement of active metal on the surface of the supporting layer of the NOx absorption-reduction catalyst and the mechanism of reduction and purification of NOx are shown in FIG. 4.

The NOx absorption-reduction catalyst 2 is formed in such a manner that a catalytic active metal 3 and a NOx absorbing substance (R) 4 having NOx absorbing feature are supported on the supporting layer 5 formed on the support 6. The supporting layer 5 is formed of a porous coating material such as porous zeolite or alumina ($Al_2O_3$), or the like. The catalytic active metal 3 is formed of platinum (Pt) having an oxidation catalytic capability. NOx absorbing substance (R) 4 is formed of potassium (K), barium (Ba), lanthanum (La) or the like.

The NOx absorption-reduction catalyst 2 absorbs NOx and discharges and purifies NOx depending on the concentration of oxygen in exhaust gas, or the concentration of carbon monoxide. In other words, the NOx absorption-reduction catalyst 2 exercises two features of absorption of NOx, and discharge and purification of NOx.

The NOx absorption-reduction catalyst 2 uses its oxidation feature of catalytic metal 3 such as platinum to oxidize nitric monoxide (NO) in exhaust gas into nitrogen dioxide ($NO_2$) by oxygen in exhaust gas as shown in FIG. 4(a) under the operation of lean air/fuel ratio in which oxygen ($O_2$) is contained in exhaust gas as in the case of normal diesel engines or lean-burn gasoline engine, and the like. The nitrogen dioxide reacts with barium 4 or the like, which is a NOx absorbing substance, to form nitrate (for example $Ba(NO_3)_2$ and the like) for absorption. Occlusion of nitrogen dioxide purifies NOx in exhaust gas.

When a state in which nitrogen dioxide is being absorbed continues, barium 4 or the like that has NOx absorbing feature is entirely changed into nitrate, thereby losing NOx absorbing capability. Therefore, in order to recover NOx absorbing capability, the operating condition of the engine is changed into a rich spike that generates exhaust gas called a rich spike gas to deliver the rich spike gas to the NOx absorption-reduction catalyst 2. The rich spike gas is exhaust gas of high temperature generated in rich air/fuel ratio (the theoretical air/fuel ratio or an air/fuel ratio close to the theoretical air/fuel ratio) operation in which the concentration of oxygen ($O_2$) contained therein is close to zero.

As shown in FIG. 4(b), owing to the rich spike, oxygen ($O_2$) in exhaust gas is eliminated, and when the temperature of exhaust gas rises, nitrate in which NOx is absorbed discharges nitrogen dioxide ($NO_2$) and returned into barium (Ba), which is the original state. Since no oxygen exists in exhaust gas, discharged nitrogen dioxide is reduced and purified into water ($H_2O$), carbon dioxide ($CO_2$), and nitrogen ($N_2$) by the reducing agents such as carbon monoxide (CO), carbon hydride (HC), Hydrogen ($H_2$), or the like in exhaust gas on the catalytic metal 3 such as platinum (Pt) having oxidation capability.

In case where exhaust gas is purified by the use of NOx absorption-reduction catalyst, the absorption of NOx under the lean-burn operation, and discharge and purification of NOx under rich-burn operation (rich spike) are repeated to continuously purify NOx exhausted from the engine.

On the other hand, since the operation of engine in rich air/fuel ratio that generate a rich spike gas for reduction of NOx causes deterioration of fuel consumption, it is necessary to keep the rich spike as low as possible. Therefore, when the method of executing a rich spike regularly by the use of a timer is employed, NOx emission changes significantly depending on the number of revolution of the engine or a load, and thus the change of NOx emission cannot be supported satisfactorily, thereby coming to the conclusion that this method is not effective.

From these reasons, in the related art, the control apparatus of the computer for controlling the engine called ECM is used for controlling a rich spike according to the control flow shown in FIG. 5. In other words, the concentration of NOx at each moment is calculated from entered load and the number of revolutions by the use of NOx concentration map that is entered in advance. As a next step, the emission of NOx (NOxc) for each operating condition of the engine is calculated by the use of calculated NOx concentration and entered intake air mass (Q), and then the emission of NOx (NOxc) is integrated. When the integrated value of NOx (NOxmass) reaches a prescribed threshold value (first reference value: NOxSL), a rich spike is executed.

However, in the related art, control is carried out with the prescribed threshold value (first reference value: NOXSL) fixed despite of the fact that the NOx absorbing capability of the catalyst is lowered with deterioration of the catalyst over time. Therefore, there is a problem in that a rich spike cannot be executed at the moment most suitable for recovering the NOx absorbing capability.

In addition, the NOx absorption-reduction catalyst is susceptible to deterioration due to sulfur poisoning, which may lower the NOx absorbing capability of the catalyst. Therefore, when a rich spike is executed according to the normal control of a rich spike, fuel consumption may be deteriorated.

In order to prevent the adverse effect caused by sulfur poisoning, it is required to promote desorption of sulfur by performing the operation in regeneration mode in which the lean-burn operation is prohibited on a regular basis and the engine is operated in a rich air/fuel ratio. However, since this regard is not considered in the exhaust gas purifying apparatus in which the NOx absorption-reduction catalyst of the related art is used, there is a problem in that the operation in regeneration mode in rich air/fuel ratio cannot be performed.

The progress of deterioration of the catalyst by sulfur poisoning varies depending on the description of the fuel or the history of the operation of the engine. Therefore, in order to know the degree of deterioration of the catalyst, it is required to monitor the state of deterioration of the catalyst.

SUMMARY OF THE INVENTION

With such circumstanced in view, it is an object of the present invention to provide an exhaust gas purifying apparatus comprising a nitrogen oxides absorption-reduction catalyst for absorbing, as well as reducing and purifying NOx in exhaust gas, wherein the value detected by the NOx sensor is used to monitor the variations in NOx absorbing capability (the amount that can be absorbed) with deterioration of the catalyst, so that a rich spike can be introduced at appropriate moments and the purifying performance with respect to NOx in exhaust gas can be improved outstanding as a whole.

It is another object to provide an exhaust gas purifying apparatus in which the value detected by the NOx sensor is used to monitor the lowering of the NOx absorbing capability caused by sulfur poisoning so that the operation in regeneration mode, or the rich air/fuel ration operation, is executed at appropriate moments to promote desorption of sulfur from the catalyst.

The exhaust gas purifying apparatus including a nitrogen oxides absorption-reduction catalyst for achieving the objects described above comprises a nitrogen oxides absorbing substance disposed in the exhaust passage of the internal combustion engine for absorbing nitrogen oxides when the air/fuel ratio is lean and discharging nitrogen oxides when the air/fuel ratio is theoretical air/fuel ratio or rich, and a precious metal catalyst, and a control apparatus for computing the integrated value of NOx from the engine load, the number of revolutions of the engine, and the intake air mass, so that a rich spike is executed when the integrated value of NOx exceeds the predetermined first reference value, characterized in that a NOx sensor is provided downstream from the nitrogen oxides absorption-reduction catalyst, and in that the control apparatus corrects the predetermined first reference value when the value detected by the NOx sensor immediately after the rich spike is executed exceeds the predetermined second reference value.

The rich spike is a special operational control of the engine in which the air/fuel ratio is temporarily shifted to rich side to supply exhaust gas of low oxygen concentration for discharging and reducing NOx to regenerate the NOx absorbing capability. The rich spike is executed for one to two seconds of period before the amount of the NOx absorption is saturated.

In this exhaust gas purifying apparatus including nitrogen oxides absorption-reduction catalyst, an NOx sensor for detecting the concentration of NOx is mounted immediately downstream of the NOx absorption-reduction catalyst to monitor the state of deterioration of the catalyst from the concentration of NOx after the NOx absorption-reduction catalyst has passed. The slice level, which is the first reference value with respect to the integrated value of the NOx emission for determining whether or not a rich spike is to be introduced, may be changed according to the NOx absorbing capability (the amount that can be absorbed) by the used of the measured value of the NOx concentration.

Therefore, the frequency of the introduction (occurrence) of the lowering of the NOx absorbing capability may be increased, and the rich spike can be introduced at appropriate moments. In other words, a rich spike can be executed at appropriate moments by correcting the first reference value for determining the timing of the introduction of a rich spike according to the NOx absorbing capability.

The exhaust gas purifying apparatus including the nitrogen oxides absorption-reduction catalyst is constructed in such a manner that the control apparatus performs the operation in regeneration mode in the rich air/fuel ratio when the predetermined first reference value is smaller than the predetermined third reference value.

The operation in regeneration mode refer to an operation for regenerating the NOx absorbing capability of the NOx absorption-reduction catalyst, in which the operation of theoretical air/fuel ratio is continuously executed, for example, for 10 to 30 minutes with the lean-burn operation prohibited.

With this control, the operation in regeneration mode can be introduced appropriately using the first reference value that is to be corrected according to the NOx absorbing capability as a criterion for assessment of the introduction of the operation in regeneration mode.

Since this operation in regeneration mode enables regeneration of the NOx absorbing capability of the catalyst, the deterioration of fuel consumption caused by frequent execution of the rich spike due to sulfur poisoning may be prevented. The increase in frequency of the rich spike is caused by lowering of the NOx absorbing capability of the catalyst as a result of growing sulfur poisoning of the catalyst due to the long-term operation of the engine.

In addition, the exhaust gas purifying apparatus including a nitrogen oxides absorption-reduction catalyst is constructed in such a manner that the control apparatus determines that the nitrogen oxides absorption-reduction catalyst is in the abnormal state when the value detected by the NOx sensor immediately after executing the operation in regeneration mode exceeds the predetermined fourth reference value. In this arrangement, the abnormality of the NOx absorption-reduction catalyst can be determined, thereby urging the operator an appropriate countermeasure.

Therefore, in the exhaust gas purifying apparatus having the nitrogen oxides absorption-reduction catalyst of the present invention, the NOx absorbing capability of the nitrogen oxides absorption-reduction catalyst can be figured out, and thus the NOx purification rate can always be maintained at a high level. Since the number of the introductions of the rich spike may be maintained at low as possible, the deterioration of fuel consumption may be prevented.

DETAILED DESCRIPTION OF THE INVENTION

Figure 1:
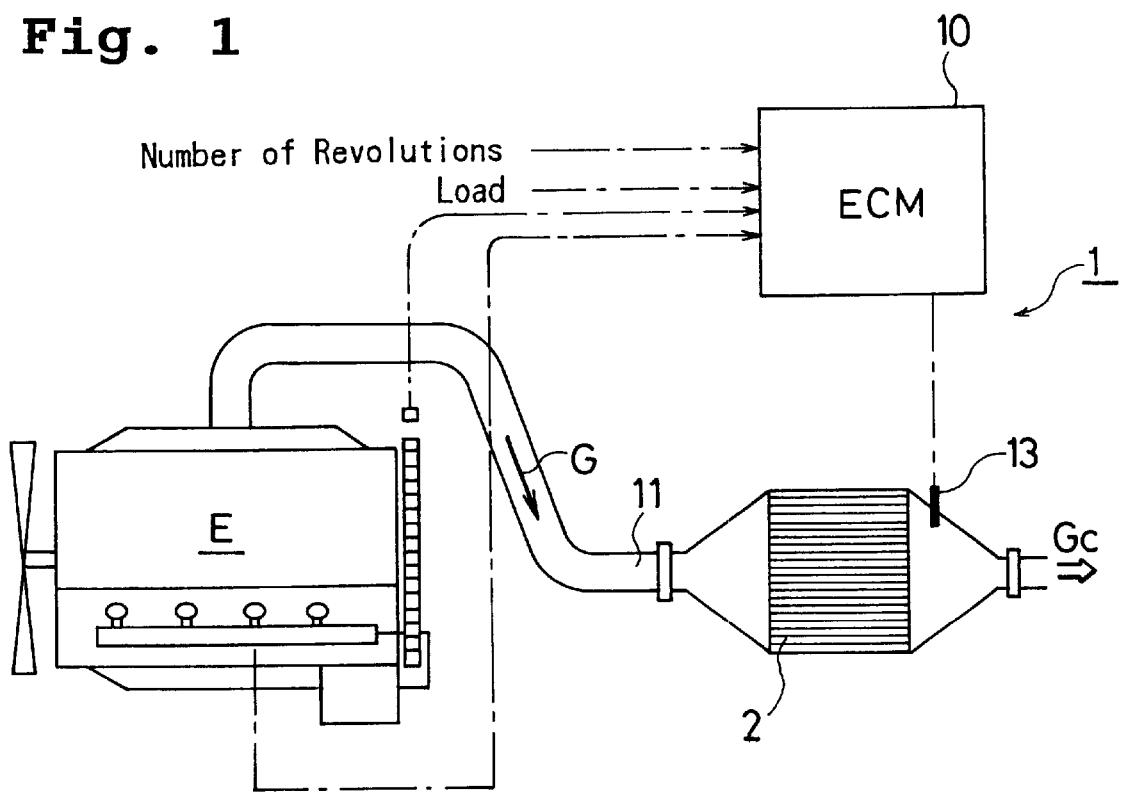
FIG. 1 is a block diagram of an exhaust gas purifying apparatus including a nitrogen oxides absorption-reduction catalyst according to the present invention.

Referring now to the drawings, an exhaust gas purifying apparatus having a nitrogen oxides absorption-reduction catalyst according to the present invention will be described.

As shown in FIG. 1, an exhaust gas purifying apparatus 1 having a nitrogen oxides absorption-reduction catalyst (NOx absorption-reduction catalyst) is disposed in the discharge passage 11 of the internal combustion engine E. Immediately downstream from the NOx absorption-reduction catalyst 2, there is provided a NOx sensor 13 for detecting the NOx concentration of purified exhaust gas Gc after it has passed through the NOx absorption-reduction catalyst 2.

Figure 4:
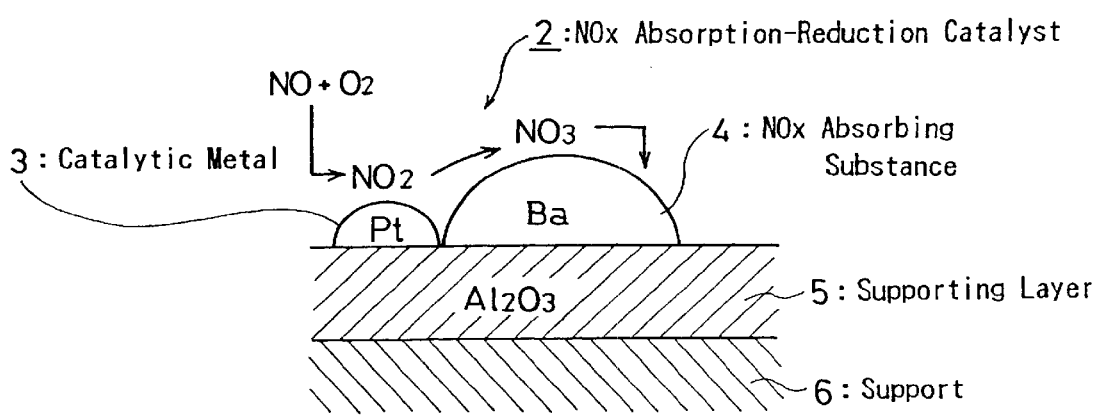
FIG. 4(a) is a schematic diagram of the construction of a nitrogen oxides absorption-reduction catalyst and mechanism of purifying NOx in exhaust gas showing the case of absorbing NOx in the state of burning in lean air/fuel ratio.
FIG. 4(b) is a schematic diagram of the construction of a nitrogen oxides absorption-reduction catalyst and mechanism of purifying NOx in exhaust gas showing the case of discharging and reducing NOx in the state of burning in rich air/fuel ratio.
Figure 4:
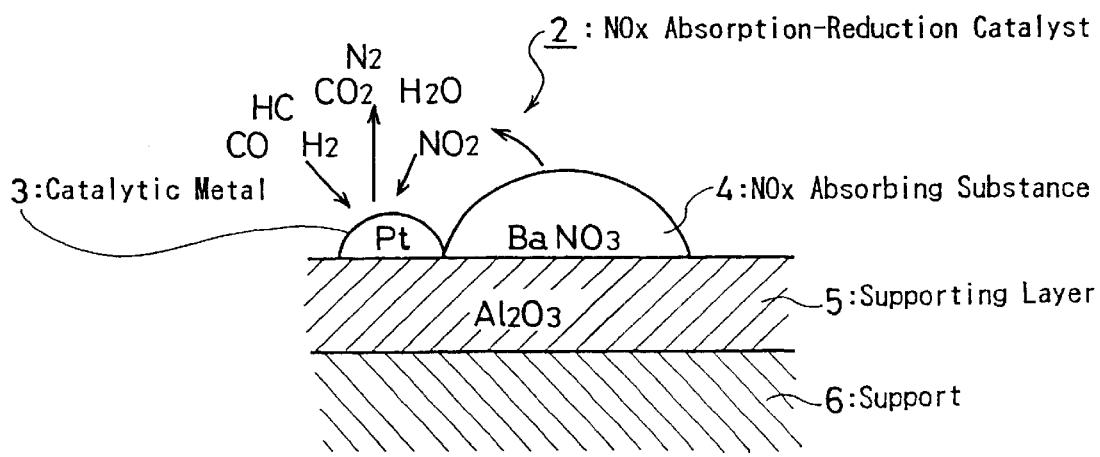
Figure 5:
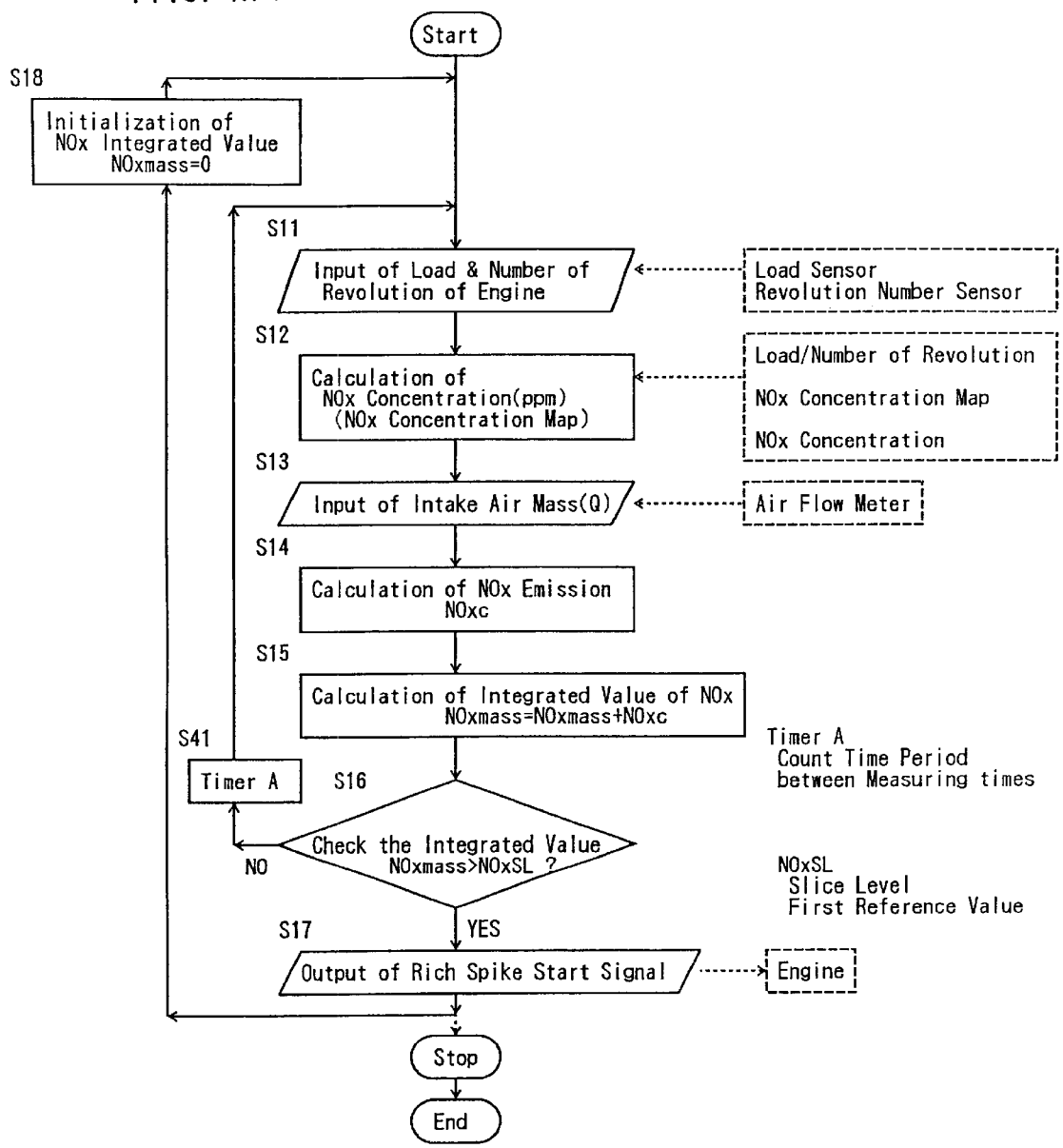
FIG. 5 is a flow chart showing a rich spike introduction control of the related art.

As the NOx absorption-reduction catalyst 2, the known NOx absorption-reduction catalyst 2 as shown in FIG. 4 can be used. The NOx absorption-reduction catalyst 2 comprises a support 6, a supporting layer 5 formed on the support 6, a catalyst metal 3 supported by the supporting layer 5, an NOx absorbing substance 4 that absorbs nitrogen oxides (NOx) when the air/fuel ratio is lean and discharges the nitrogen oxides when the air/fuel ratio is rich. The supporting layer 5 is a catalyst support formed of a porous coating material such as alumina or the like.

Though the catalyst metal 3 is formed of platinum (Pt) or the like having a reduction activity in the temperature region higher than the light on temperature, other catalyst metal may be used. In the case of platinum, the light on temperature is in the region about 150° C.–200° C.

As Nox absorbing substances 4, barium (Ba), calcium (Ca) and the like may be employed. When barium is employed, the temperature for starting discharge of Nox is in the vicinity of 450° C. The NOx absorbing substance 4 may be, as shown in FIG. 4, supported by the catalyst support 5, but it is also possible to form the catalyst support 5 of the NOx absorbing substance 4 instead.

The exhaust gas purifying apparatus having the NOx absorption-reduction catalyst of the present invention is constructed in such a manner that the rich spike introduction control and the regeneration mode introduction control as described below are executed.

Figure 2:
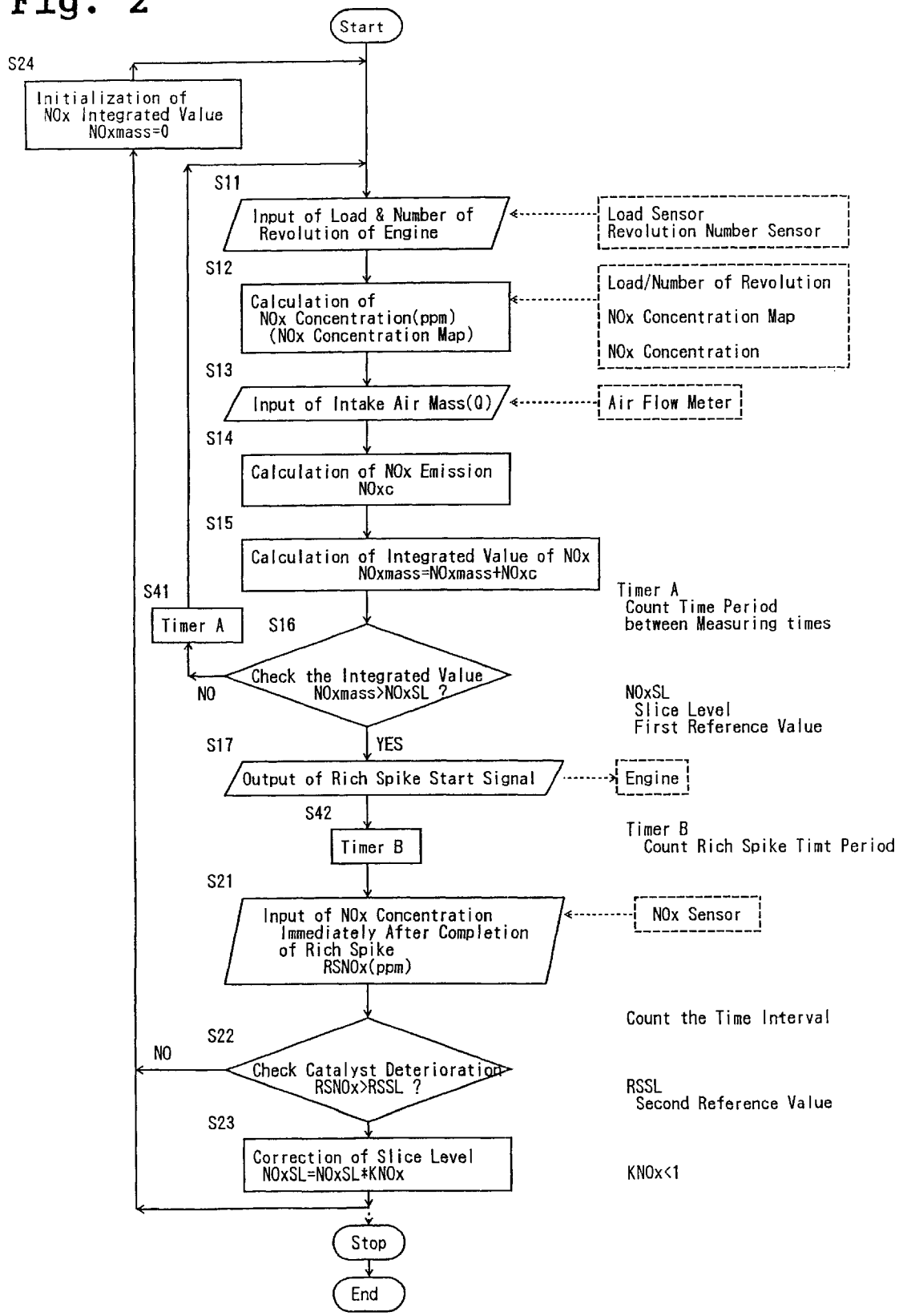
FIG. 2 is a flow chart showing a rich spike introduction control according to the present invention.

The rich spike introduction control according to the present invention is executed according to the control flow chart exemplified in FIG. 2. The rich spike is the operation of engine in which the air/fuel ratio is temporarily shifted to the rich side before the amount of NOx absorption is saturated to supply exhaust gas of low oxygen concentration, so that NOx is discharged and reduced to regenerate the NOx absorption capability.

The control flow is to be executed concurrently with the control of the engine operation, which starts with the commencement of the engine operation control, and is interrupted when the engine operation control stops, the control flow is interrupted in mid course thereof, and then proceeds to stop and ends.

When the control flow starts, a load and the number of revolutions are entered from the load sensor and the engine revolution sensor in Step S11, and then the NOx concentration at arbitrary moments is calculated from the NOx concentration map entered in advance by the use of the entered load and the number of revolution of the engine in Step S12.

The intake air mass Q entered in Step S13 and the calculated NOx concentration are used in Step S14 to calculate the NOx emission for every state of engine operation NOxc, and then integrated to obtain the integrated value of NOx (Integrated amount: NOxmass) in Step S15. When the engine is stopped before regeneration, the integrated value NOxmass at that moment is stored, and the stored value is used as a base of integration for the next start.

In Step 16, whether or not the integrated value NOxmass of the NOx reaches the predetermined first reference value NOxSL is determined. When reached (YES), a rich spike start signal is supplied in Step S17 to introduce a rich spike.

When the integrated value NOxmass of the NOx does not reach the predetermined first reference value NOXSL (NO) in step S16, the time period between measuring times is counted by the timer A, and after this counted time period is elapsed, the flow returns to the step S11 and repeats Steps S11–S16.

In the present invention, after the rich spike is introduced in Step S17, the rich spike time period is counted by the timer B, and after the counted time period is elapsed, the NOx concentration immediately after the rich spike terminates is measured by the NOx sensor 13 disposed immediately downstream from the catalyst 2 in Step S21.

The NOx concentration RSNOX immediately after the rich spike terminates is compared with the predetermined second reference value RSSL to detect the state of deterioration of the catalyst (RSNOx>RSSL) in Step S22, and when it is in the deteriorated state (RSNOx>RSSL) (YES), the slice level NOXSL, which is the first reference value, is corrected in Step S23. This correction is executed by multiplying the slice level NOXSL of the previous time by a coefficient KNOX (KNOX<1).

When the catalyst 2 is not in the deteriorated state (RSNOx>RSSL) (NO) in Step S22, the integrated value NOxmass of NOx is initialized in Step S24 to repeat the control.

In the following control, the integrated value NOxmass of NOx is computed from the engine load, the number of revolutions of the engine, and the intake air mass Q, and when the integrated value NOxmass of NOx exceeds the predetermined first reference value NOXSL, the control to execute a rich spike is enabled, and when the value detected by the NOx sensor RSNOx obtained immediately after execution of a rich spike exceeds the predetermined second reference value RSSL, the predetermined first reference value NOxSL may be corrected.

Figure 3:
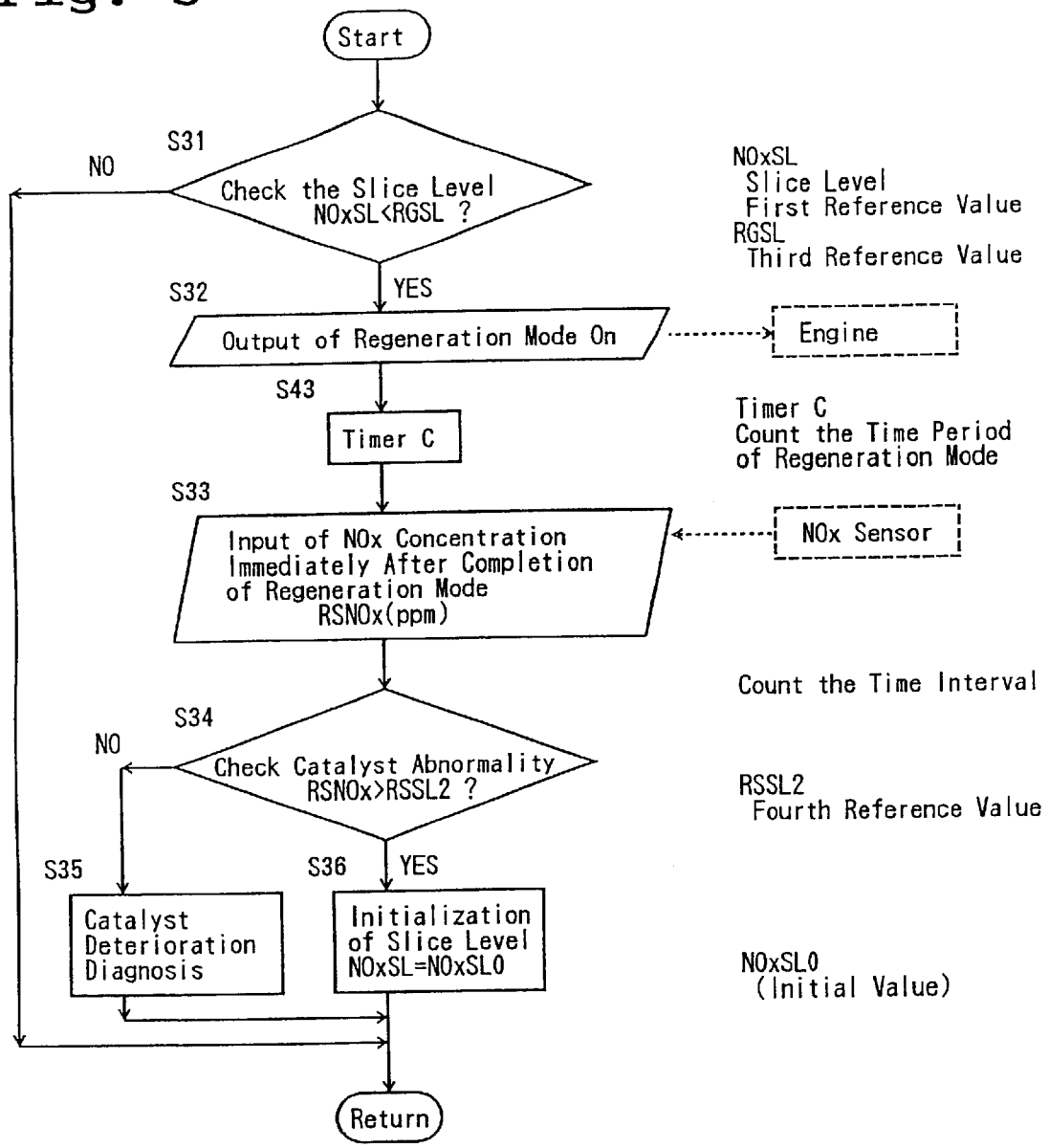
FIG. 3 is a flow chart of a regeneration mode introduction control according to the present invention.

The regeneration mode introduction control according to the present invention will now be described. This control is executed according to the control flow chart exemplified in FIG. 3.

The regeneration mode operation is for regenerating the NOx absorption capability of the NOx absorption-reduction catalyst, and continues the operation prohibiting the lean-burn operation for a predetermined time period (for example, about 10-30 minutes). The regeneration mode operation is for dealing with deterioration of the fuel consumption caused by frequent introduction of a rich spike according to the above-described rich spike introduction control when the NOx absorbing capability of the catalyst is reduced due to progress of sulfur poisoning as a result of long-term operation.

This flow is called and executed repeatedly in conjunction with appropriate time intervals or a specific step of the above-described rich spike introduction control (for example, immediately after Step S23).

In a first place, when the control flow starts, the slice level NOxSL, which is the predetermined first reference value, is checked in Step S31. When the slice level NOXSL exceeds the predetermined third reference value RGSL (NO), the regeneration mode operation is determined to be unnecessary, and thus the flow proceeds to return. On the other hand, when the slice level NOXSL is smaller than the predetermined third reference value RGSL (YES), the regeneration mode operation is determined to be necessary, and thus a signal of regeneration mode ON is supplied to regenerate the NOx absorption-reduction catalyst in Step S32. This regeneration mode operation counts the time period immediately after turning ON by the timer, and terminates when the regeneration mode operation is executed for the predetermined time period.

When the time period of the regeneration mode operation is counted by the timer C in Step S43, and after the time period is elapsed, the NOx concentration RSNOX on the downstream from the catalyst is measured immediately after the regeneration mode terminates in Step S33, and when the NOx concentration RSNOx is lower than the predetermined fourth reference value RSSL2 (YES) and thus it is determined that the regeneration of the catalyst is completed in Step S34, the slice level NOxSL for checking the NOx integrated value is initialized to reset the slice level NOXSL to the initial value NOxSLO in Step S36, and the flow proceeds to return.

However, when the determination of Step S34 shows that the NOx concentration RSNOX downstream of the catalyst immediately after the regeneration mode terminates exceeds the predetermined fourth reference value RSSL2, the recovery of the NOx purification rate of the catalyst cannot be observed even in the regeneration mode. In such a case, it is determined to be abnormal catalyst, which is the case where the catalyst is deteriorated by the cause other than sulfur poisoning, and the flow proceeds to Step S35 in which the deterioration of the catalyst is diagnosed, and the engine check lamp is turned on, and then returns.

With such a control described thus far, when the predetermined first reference value NOXSL is smaller than the predetermined third reference value RGSL, the regeneration mode operation in the theoretical air/fuel ratio may be executed.

Therefore, in the exhaust gas purifying apparatus 3 having the nitrogen oxides absorption-reduction catalyst 2, the state of deterioration of the catalyst 2 can be monitored by the NOx concentration RSNOx measured by the NOx sensor 13, so that the first reference value NOXSL with respect to the integrated value NOxmass of the NOx emission for determining whether or not the introduction of a rich spike is possible may be varied according to the NOx absorption capability at the moment.

Therefore, the frequency of the introduction of a rich spike may be increased with lowering of the NOx absorption capability, and thus a rich spike can be introduced at appropriate moments.

In the exhaust gas purifying apparatus 3, the first reference value NOXSL to be corrected according to the NOx absorption capability is used as a criterion for assessment of the introduction of the operation in regeneration mode, so that the introduction of the operation in regeneration mode can be executed appropriately.

Since the NOx absorption capability of the catalyst 2 can be regenerated by the regeneration mode operation, the deterioration of fuel consumption caused by the frequent rich spike due to sulfur poisoning may be prevented.

In addition, since the abnormality of the nitrogen oxides absorption-reduction catalyst 2 can be determined, thereby urging the operator an appropriate countermeasure.

As a consequent, in the exhaust gas purifying apparatus 1 having the nitrogen oxides absorption-reduction catalyst 2 of the present invention, the NOx absorption capability of the nitrogen oxides absorption-reduction catalyst 2 can be figured out, and thus the NOx purification rate can always be maintained at a high level. Since the number of the introductions of the rich spike may be maintained as low as possible, the deterioration of fuel consumption may be prevented.

The embodiment described thus far is intended to clarify the technological aspect of the invention, and thus the present invention is not to be narrowly interpreted by being limited to the embodiment shown here, but should be widely interpreted that various modification may be made without departing form the spirit and the scope of the invention as hereinafter claimed.

What is claimed is:

1. An exhaust gas purifying apparatus 1 having a nitrogen oxides absorption-reduction catalyst comprising:
    a nitrogen oxides absorption-reduction catalyst 2 having a nitrogen oxides absorbing substance 4 provided in the exhaust passage 11 of the internal combustion engine E for absorbing nitrogen oxides when the air/fuel ratio is lean and discharging nitrogen oxides when the air/fuel ratio is theoretical air/fuel ratio or rich, and a precious metal catalyst 3; and
    a control apparatus 10 for computing the integrated value of NOx (NOxmass) from the engine load, the number of revolutions of the engine, and the intake air mass, so that a rich spike is executed when the integrated value of NOx (NOxmass) exceeds the predetermined first reference value (NOxSL);
    characterized in that a NOx sensor 13 is provided downstream from the nitrogen oxides absorption-reduction catalyst 2, and in that the control apparatus 10 corrects the predetermined first reference value (NOxSL) when the value detected by the NOx sensor 13 (RSNOx) immediately after the rich spike is executed exceeds the predetermined second reference value (RSSL).

2. An exhaust gas purifying apparatus having a nitrogen oxides absorption-reduction catalyst as set forth in claim 1, characterized in that the control apparatus 10 performs the operation in regeneration mode in the rich air/fuel ratio when the predetermined first reference value (NOXSL) is smaller than the predetermined third reference value (RGSL).

3. An exhaust gas purifying apparatus having a nitrogen oxides absorption-reduction catalyst as set forth in claim 2, characterized in that the control apparatus 10 determines that the nitrogen. oxides absorption-reduction catalyst 2 is in the abnormal state when the value detected by the NOx sensor 13 (RSNOx) immediately after executing the operation in regeneration mode exceeds the predetermined fourth reference value (RSSL2).

* * * * *

UNITED STATES PATENT AND TRADEMARK OFFICE
CERTIFICATE OF CORRECTION

PATENT NO.    : 6,460,329 B2
DATED         : October 8, 2002
INVENTOR(S)   : Keiji Shimotani et al.

It is certified that error appears in the above-identified patent and that said Letters Patent is hereby corrected as shown below:

Title page,
Item [57], ABSTRACT,
Line 8, change "NOXSL" to -- $NO_xSL$ --.
Line 9, change "RSNOX" to -- $RSNO_x$ --.
Line 16, change "outstanding" to -- outstandingly --.

Signed and Sealed this

Twenty-fourth Day of June, 2003

JAMES E. ROGAN
*Director of the United States Patent and Trademark Office*